United States Patent [19]
Robbins et al.

[11] 3,858,204
[45] Dec. 31, 1974

[54] CLOSED LOOP GAIN CONTROL TUNNEL-DIODE BASE BAND OBJECT DETECTOR

[75] Inventors: Kenneth W. Robbins, Wilmington; Gerald F. Ross, Lexington, both of Mass.

[73] Assignee: Sperry Rand Corporation, New York, N.Y.

[22] Filed: July 19, 1973

[21] Appl. No.: 380,628

[52] U.S. Cl. ............... 343/7 ED, 325/325, 343/7 A, 343/17.1 R
[51] Int. Cl. ......... G01s 7/28, G01s 9/02, H04b 1/16
[58] Field of Search ............ 325/129, 325; 343/7 A, 343/7 ED, 17.1 R

[56] References Cited
UNITED STATES PATENTS

| | | | |
|---|---|---|---|
| 3,383,682 | 5/1968 | Stephens, Jr. | 343/8 X |
| 3,662,316 | 5/1972 | Robbins | 343/17.1 R |
| 3,735,398 | 5/1973 | Ross | 343/7 ED |
| 3,750,025 | 7/1973 | Ross | 343/17.1 R X |
| 3,772,697 | 11/1973 | Ross | 343/17.1 R X |
| 3,794,996 | 2/1974 | Robbins et al. | 343/7 A |

*Primary Examiner*—Malcolm F. Hubler
*Attorney, Agent, or Firm*—Howard P. Terry

[57] ABSTRACT

An energy-amplifying signal-selecting circuit for sampling base-band signals, such as directionally transmitted subnanosecond signals reflected from objects, provides a substantial output signal for operation of apparatus, for example, such as passenger protective or restraining apparatus in the event of a vehicular collision. The system includes a broad band transmission line antenna cooperating with biased semiconductor first and second detector elements, the first detector element being located within the transmission line for stable detection of substantially the total energy of a received base band echo signal. The second or gated detector provides time selected or gated outputs indicating the presence of the gated echo pulse within the time gate.

9 Claims, 4 Drawing Figures

CLOSED LOOP GAIN CONTROL TUNNEL-DIODE BASE BAND OBJECT DETECTOR

BACKGROUND OF THE INVENTION

1. Field of the Invention

The invention pertains to means for the reception selective gating, and wave form conversion of base-band or subnanosecond electromagnetic signals and more particularly pertains to means for stable reception and selective use of such base band signals for the generation of alarm or control signals for safety purposes.

2. Description of the Prior Art

Generally, prior signal selector or gating systems have been associated with gating of pulsed continuous wave signals that are often each of many radio frequency cycles duration. In such prior systems, the pulsed signal to be selected is normally a pulsed high frequency carrier signal, so that complex signal reception, amplification, and frequency conversion circuits must be used to process the signal prior to the range gating or selection step. Because such arrangements are complex and relatively inefficient, they are prone to many failure possibilities. Furthermore, conventional object detection receiver and signal gating systems are not capable of measuring ranges of close-by objects. Also, prior art selector or range gating circuits are not adaptable to the direct processing of nanosecond or subnanosecond signals.

One effective system for object detection by radiation and reception of base band or subnanosecond electromagnetic pulses is the subject of the G.F. Ross U.S. patent application Ser. No. 137,355, now U.S. Pat. No. 3,750,025, filed Apr. 26, 1971 for an "Energy Amplifying Selector Gate for Base-Band Signals," and assigned to the Sperry Rand Corporation. A system is taught therein for receiving and selectively gating very short base band electromagnetic pulses and for generating an energy amplified output useful for operating conventional utilization equipment. The system of the latter Ross application employs a substantially dispersionless transmission line antenna arrangement cooperating with a biased semiconductor gating or selector device located directly within the antenna transmission line for detecting the total energy of in-coming base band pulses. A cooperating circuit coupled to the gating device produces a corresponding output signal suitable for application in utilization devices incorporating generally conventional circuits of the type designed to process pulse signals of more normal duration.

While such base band gated receiver systems perform satisfactorily in many applications, they are not always suited for reliable operation where a very wide range of adverse environmental temperature or humidity conditions must be tolerated. In particular, in some severe environments such as in certain types of heavy motor vehicles, the prior art base-band receiver does not reliably maintain the desired response at the desired threshold level. Ignition noise and vibration are also factors which undermine the reliability of prior art devices in certain applications. Along with achieving increased system detection reliability so that false alarms are substantially eliminated, it is desired considerably to increase the sensitivity of the base band gated receiver.

SUMMARY OF THE INVENTION

The present invention relates to an electromagnetic energy pulse system for transmitting very short baseband pulses and for their reception after reflection from objects to be detected. The base band receiver processes the base-band signals, generating an energy amplified output useful for operating utilization equipment. The novel system employs dispersionless transmitter and receiver antenna and transmission line elements cooperating directly with a biased tunnel diode detector placed directly within the receiver transmission line for detecting the total energy of each echo pulse. The tunnel diode detector is placed in a closed loop circuit automatically exercising gain control over the tunnel diode, synchronizing operation of transmitter, sensitivity time control, and range gating functions, and enhancing the received echo for range gating by the avalanche range gating detector. The gated and enhanced signal produced by the latter detector is employed to actuate vehicle or passenger protective mechanisms.

DESCRIPTION OF THE PREFERRED EMBODIMENT

Figure 1:
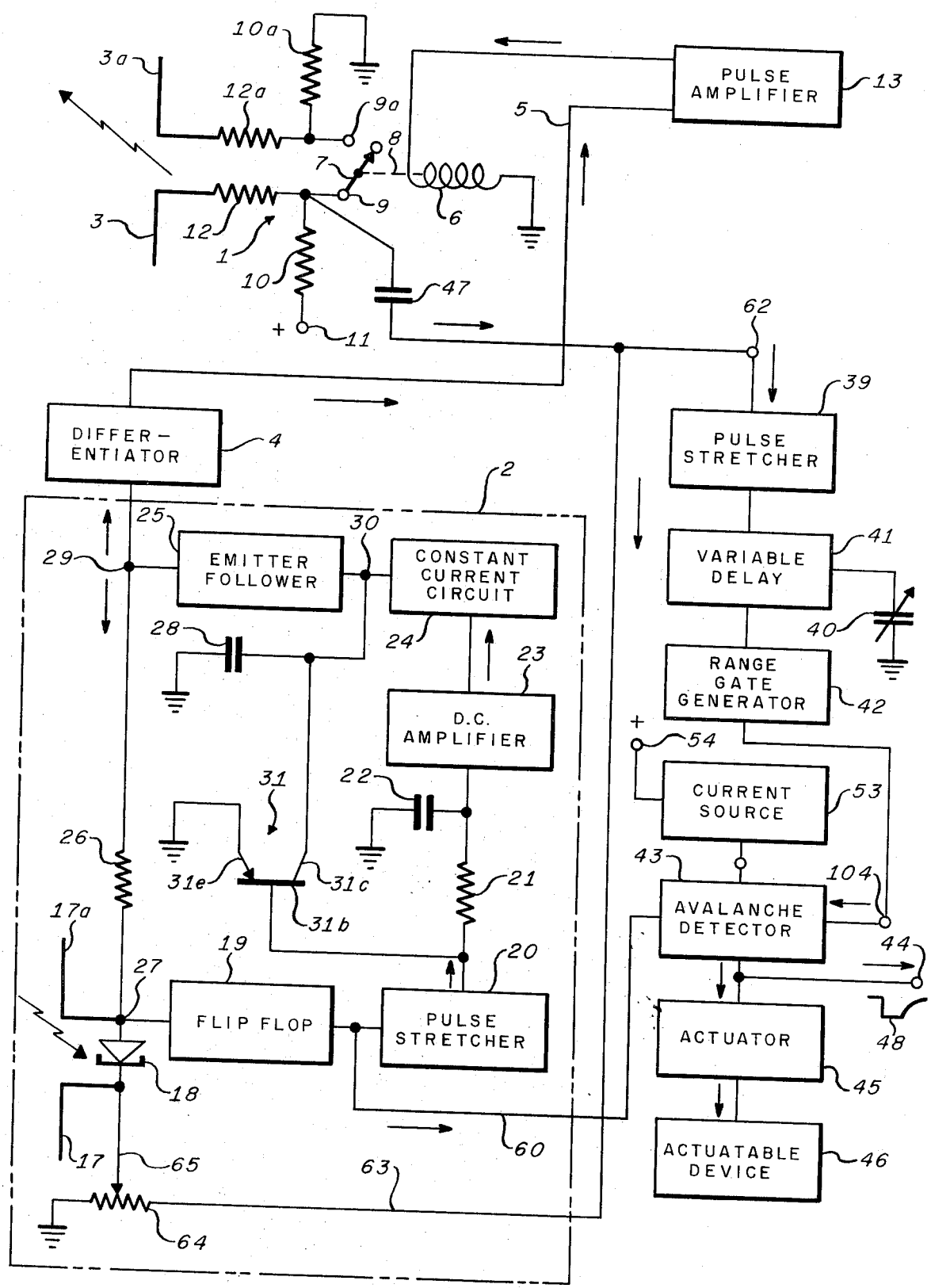
FIG. 1 is a block diagram of the invention showing electrical connections between its components.

The short pulse transmitter 1, which may be a generator of a train of base band or subnanosecond duration pulses, is activated by a synchronizing wave form generated within receiver 2 and supplied to it as short pulses by a conventional differentiator circuit 4 via lead 5. If desired, the level of the pulses appearing on lead 5 may be amplified by a conventional pulse amplifier 13. Flow of regular current pulses from amplifier 13 through coil 6 controls switch 7 for the purpose of operating transmitter 1 because of the action of mechanical connection 8 in alternately connecting and disconnecting terminals 9 and 9a. Switch 7 may take various convenient forms, but may be a commercially available mercury-wetted, single pole, single throw, normally-open reed switch providing, upon closure, a current pulse therethrough having a 100 picosecond or less rise time. For example, suitable switches having a fraction of an ohm in resistance when closed, a 300 volt make-break capability, and up to a 200 cycle per second operating frequency with a 1 millisecond closure time are readily available on the market.

Switch 7 is thus used periodically to excite a simple radiator antenna, such as a dipole antenna having paired radiating conductors 3 and 3a. Charging resistors 10, 10a are of a relatively high resistance value. Resistor 10 couples antenna conductor 3 to a potential source (not shown) coupled to terminal 11. Resistor 10a couples antenna conductor 3a to ground. The paths from terminals 9, 9a to the respective antenna conductors 3, 3a pass through similar matching resistors 12, 12a. Resistors 10, 10a may be 10 megohms each, while resistors 12, 12a may be 100 ohms. Closure of switch 7, occurring about 1 millisecond after driver coil 6 is energized, causing a fast rising base band pulse to be propagated through the transmission line including resistors 12, 12a and the respective dipole elements 3, 3a and to be launched into space by the latter.

The transmitter 1 and its associated antenna 3, 3a may take any of several forms, such as that of the G.F. Ross, D. Lamensdorf U.S. patent application Ser. No. 46,079 for a "Balanced Radiator System," filed June 15, 1970, now U.S. Pat. No. 3,659,203, and assigned to the Sperry Rand Corporation. Suitable transmitter and antenna arrangements are also illustrated in the above mentioned G.F. Ross U.S. patent application Ser. No. 137,355, now U.S. Pat. No. 3,750,025, and in the G.F. Ross U.S. patent application Ser. No. 145,154, for "Base Band Short Range Pre-Collision Sensor on Actuating a Vehicle Safety Apparatus," filed May 20, 1971 and now U.S. Pat. No. 3,735,398, both patents being assigned to the Sperry Rand Corporation.

Figure 4:
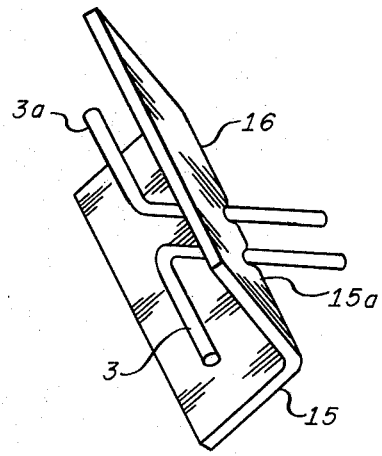
FIG. 4 is a perspective view of one of the antennas employed in FIG. 1.

The antenna may take the form shown in FIG. 4 with the leads supporting dipole elements 3, 3a projecting through clearance holes in the apex 16 of a reflector made up of similar flat conductors 15, 15a. The dipole 3, 3a lies in a plane bisecting the vee-shaped cross section of reflector 15, 15a. The dipole antenna 3, 3a inherently has a major degree of directivity in the horizontal or bisecting plane, and the vee-shaped reflector 15, 15a desirably adds directivity in the vertical plane or the plane perpendicular to the bisector plane. Other antenna feeds or reflectors may alternatively be employed.

Receiver antenna 17, 17a is oriented so as to view objects illuminated by energy directed toward them by transmitter antenna 3, 3a. The receiver antenna 17, 17a may also have a reflector structure generally similar to that of FIG. 4, but is coupled for collection of object reflected base-band signals. In a representative application for measuring the distance between the front of a first vehicle and the rear of a second, the centers of the antenna 3, 3a and 17, 17a may be spaced apart by about 50 centimeters with their dipole conductors horizontal. The dipole tips for each dipole pair may be spaced about 10 centimeters apart.

Receiver antenna 17, 17a may be connected by a matching transmission line directly across a tunnel diode 18 of the general type preciously described in the K.W. Robbins U.S. Pat. No. 3,662,316, issued May 9, 1972 for a "Short Base-Band Pulse Receiver" and assigned to the Sperry Rand Corporation. Suitable silicon tunnel diodes have a negative resistance current-voltage characteristic such that, under proper bias, the diode responds to the arrival of received echo signals by moving abruptly into a region of instability, becoming highly conductive. Diode 18 is matched to the TEM mode transmission line cooperating with antenna 17, 17a by well known techniques so that substantially the entire energy of the received pulse wave form is absorbed by diode 18.

Tunnel diode 18 is placed in a control loop whereby its repetition response frequency is determined and, simultaneously, the keying rate of transmitter 1 is also established. The gain control loop involves flip-flop circuit 19, pulse stretcher 20, resistor 21, capacitor 22, amplifier 23, constant current circuit 24, emitter follower circuit 25, and resistor 26 which is connected to one input junction 27 of flip-flop circuit 19.

Flip-flop circuit 19 is preferably a conventional high speed flip-flop which responds to the transition to high conductivity of tunnel diode 18 by generating a somewhat amplified current pulse of predetermined amplitude. If desired, its output pulse may be further amplified, lengthened, or otherwise shaped by the pulse stretcher 20, which latter device may also be a conventional monostable flip-flop circuit. The output of pulse-stretcher circuit 20 is fed to branching circuits, one of which includes resistor 21 and capacitor 22 is an integration circuit. The output of integrator 21, 22 is fed to an amplifier 23 which may be a gain-stable direct current amplifier in the form of a conventional operational amplifier.

A constant current circuit 24 in the form of a conventional field-effect circuit receives the output of amplifier 23 and is used, as will be seen, for periodically recharging capacitor 28, one side of which is grounded. It will be seen that alternate charging and discharging of capacitor 28 provides a saw toothed wave form at the output junction 29 of emitter follower 25, whose input junction 30 is common to the charging input of capacitor 28. The saw tooth wave form at junction 29 is coupled through resistor 26 to junction 27, as described in the foregoing. It is also seen that junction 29 supplies its saw tooth wave to differentiator 4. The train of sharp pulses for actuating switch 7 is generated by differentiator 4 synchronously with the rapid discharging of capacitor 28.

For periodic discharge of capacitor 28, the output of pulse stretcher 20 is also coupled to the base 31b of transistor 31, whose emitter 31e is grounded. The collector 31c of transistor 31 is connected to junction 30; it is seen that transistor 31 is periodically caused to conduct by pulse stretcher 20, the stretched pulse from pulse stretcher 20 being of substantially shorter duration than one cycle of the saw tooth sweep at junction 29.

Figure 2:
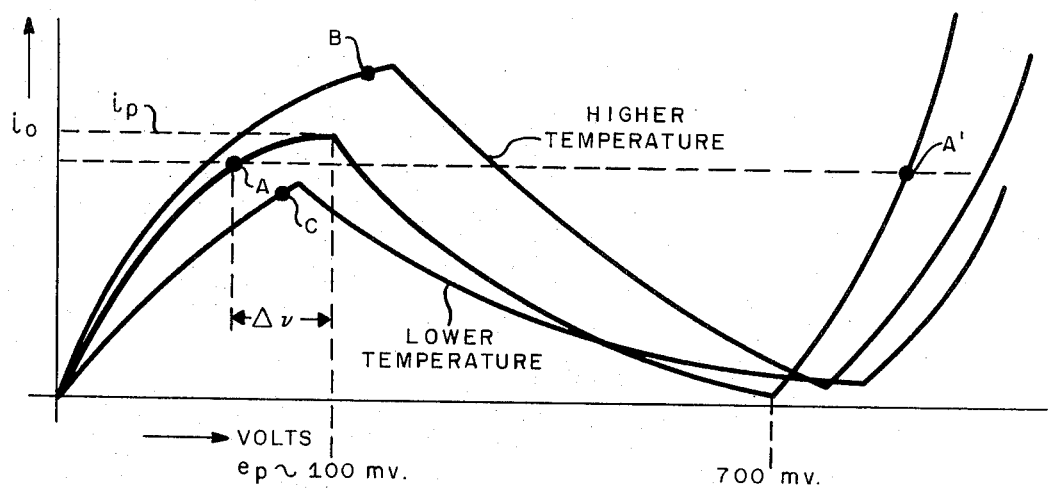
FIGS. 2 and 3 are wave form graphs useful in explaining the operation of the invention.

The receiver device 2 is characterized by a given input threshold voltage invariant with temperature variations; the seat of this property lies in the unconstant nature of the tunnel diode 18 which has the typical characteristics shown in FIG. 2. For a nominal operating current $i_o$ through diode 18, there is a predetermined operating point A in FIG. 2; for application of an incremental voltage change $\Delta v$, operation moves to a second stable state A'. As the point A is moved progressively to the threshold point $e_p$, the effective sensitivity or voltage gain $\Delta V/\Delta v$ is increased. In a practical example, $\Delta V$ for a silicon tunnel diode 18 is about 1 volt, while $\Delta v$ ranges from 10 to 20 millivolts. However, the FIG. 2 characteristics of such diodes vary considerably with temperature and $\Delta v$ is not constant; for an increase with temperature, the effective sensitivity drops and for a decrease in temperature, the diode jumps permanently to its high current state and serves no useful purpose as a detector.

The closed loop tunnel diode automatic gain control base-band detector or receiver 2 provides the desired sensitivity to a predetermined threshold voltage, the threshold level being invariant with temperature. The voltage gain of the receiver 2 varies with the amplitude of the input signal. For example, consider that the current flowing through diode 18 in one stable state is very small; this current will evidently begin to rise in a saw tooth manner. When the current corresponds to that exceeding the threshold voltage $e_p$ for diode 18, an abrupt shift of diode 18 to its second or high current state comes about and this current step is converted by flip-flop circuit 19 into a pulse which is then stretched

(20) to form a standard pulse. The latter is first used to discharge condenser 28, which condenser 28 initially caused the current traversing diode 18 to rise, returning tunnel diode 18 to its low conducting state.

Figure 3:
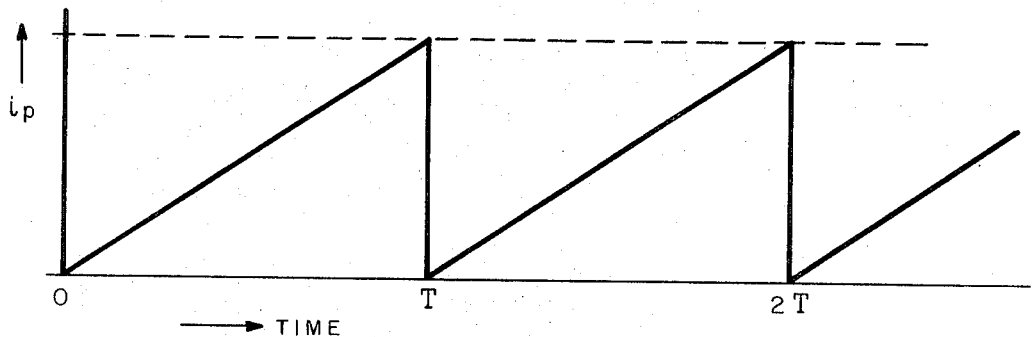

The output of pulse stretcher 20, when integrated, provides the constant charging current for capacitor 28 and the voltage across capacitor 28 serves as the power source for tunnel diode 18. Because the capacitance of capacitor 28 is constant, the charging current determines the time that the threshold point of tunnel diode 18 is reached, thus determining the transitions of state per unit of time experienced by the tunnel diode 18. In a representative situation, tunnel diode 18 changes state at the rate of $10^4$ times per second. The output from the pulse stretcher 20 is, in this situation, a 10 kHz periodic pulse train, the individual pulses having durations and amplitudes depending on the selected characteristics of pulse stretcher 20. The output of integrator 21, 22 is therefore a unidirectional voltage whose amplitude is inversely proportional to the period of the pulse train. This unidirectional voltage, when amplified by elements 23 and 25, provides the current to charge capacitor 28 according to the usual relation:

$$V = \frac{1}{C} \int_0^T i \, dt \quad (1)$$

where $V$ is the voltage across capacitor 28 therefore applied to the input of emitter follower 25, and $T$ is the repetition rate of the saw tooth wave resulting from the abrupt transition properties of tunnel diode 18. The capacitor 28 is discharged at the beginning of each pulse of the pulse train, as shown in FIG. 3, by the discharge transistor 31. Since the field effect transistor circuit 24 is a constant current device, the voltage applied to tunnel diode 18 is:

$$v_p = I_o T / C \quad (3)$$

so that the voltage supplied to flip-flop 19 is:

$$v = V_s t / T \quad (4)$$

where $t$ is the time duration of the pulse formed by pulse stretcher 20, $V_s$ is the voltage amplitude of the latter pulse, and $T$ is the time period common to the saw tooth and pulse train wave forms.

The characteristics of relatively inexpensive tunnel diodes do change considerably with temperature. When used in the circuit of FIG. 1, an increase in temperature of the diode 18 requires an increased input current level to trigger the diode (FIG. 2, point B). Thus, for a given constant charging current, the time to reach the new threshold level increases and the repetition frequency of the loop is diminished. In turn, there is a decrease in the integrated voltage $v$ of equation (4) supplied by integrator 21, 22. This decrease in integrated signal, after passage through amplifier 23 and constant current circuit 24, is of such a sense as to increase the current flowing toward tunnel diode 18, decreasing the time $T$, and stabilizing the loop at a new output level. With appropriate gain and stability for the elements of the loop, thermal variations in the tunnel diode loop may be suppressed by a factor of about one thousand.

As noted in the foregoing, the receiver 2 is employed to generate a pulse train for synchronizing transmitter 1. For this purpose, the repetitive saw tooth wave form of FIG. 3 appearing at junction 29 is applied to a conventional differentiator, where a unipolar pulse train is developed on output lead 5. This pulse signal may be amplified by a pulse amplifier 13, if derived, before application to control the transmitter radiator system associated with switch 7.

Receiver 2 also supplies synchronization, in an indirect way, of the range gating portion of the invention shown at the right side of FIG. 1 and of the receiver sensitivity time control function. The range gating system is generally similar to that previously described in the pending U.S. patent application Ser. No. 271,084, now U.S. Pat. No. 3,794,996, filed July 12, 1972 in the names of K. W. Robbins and G. F. Ross for a "Stable Base-Band Superregenerative Selective Receiver" and assigned to the Sperry Rand Corporation. The range gating circuit accepts the enhanced signals generated by flip-flop 19 and supplied to it via lead 60. It also accepts synchronizing pulse signals coupled by capacitor 47 from the transmitter switch junction 9 to input junction 62. Synchronization of the range gating system in this manner assures that proper synchronization is maintained between the transmitter 1, the receiver 2, and the range gating circuit.

The synchronizing pulse appearing at junction 62 is coupled to a conventional pulse stretcher circuit 39; circuit 39 lengthens the base band pulse coupled by capacitor 47 to a length generally suitable for application to a conventional variable delay circuit 41. The amount of delay of the pulse in delay unit 41 is determined by manually or electronically varying a parameter of an element of a conventional delay circuit 41, such as adjustable capacitor 40, which, it is understood, may be an automatically or remotely adjustable varactor in certain applications. The amount of delay inserted by variable delay circuit 41 determines the time at which the conventional gate generator 42 produces an output range gate pulse.

The gate produced by range gate generator 42 is passed as a gating or enabling input to a conventional avalanche detector 43, to a second input of which is coupled the enhanced echo pulse produced by flip-flop 19. Detector 43 is fed a constant current from current source 53 derived from a supply (not shown) attached to terminal 54. When there is coincidence between the range gate and the enhanced echo wave, an output wave 48 is generated by the avalanche detector 43 and will appear at the output terminal 44 thereof. The output 48 may be applied to a conventional actuator to operate a conventional actuatable device 46, such as an air bag or other safety or passenger restraining device of the kind discussed in the above mentioned Ross U.S. Pat. No. 3,735,398. The variable delay 41, range gate generator 42, and avalanche gated detector 43 may be generally similar to corresponding elements shown, for example, in the above mentioned patent applications Ser. No. 137,355, now U.S. Pat. No. 3,750,025, or Ser. No. 145,154, now U.S. Pat. No. 3,735,398. A version of the synchronizing signal appearing on terminal 62 is supplied via lead 60 to one end of the grounded potentiometer 64 whose manually adjustable tap is connected in common with antenna element 17 to tunnel diode 18. Thus, sensitivity time control is readily provided in the general manner described in the above mentioned patent application Ser. No. 271,084, now U.S. Pat. No. 3,794,996.

Accordingly, it is seen that the base-band object detection and range gating system of the present invention provides enhanced sensitivity with stability maintained over a wide temperature range because of the automatic gain control arrangement employed. The same features additionally enhance the stability of the system when it is disturbed by other environmental conditions such as high humidity. It is seen that the tunnel diode sensor 18 is a sensitive device permitting operation of transmitter 1 and receiver 2 at millisecond switching rates. The gated avalanche detector 43 may be considerably less sensitive than the tunnel diode detector 18 and therefore it may be adjusted to have considerable inherent stability. Essentially, detector 43 is an AND circuit where the two inputs are the range gate and the reconstituted echo pulse from the tunnel diode 18. Accordingly, processing of an incoming echo signal is accomplished in two steps so that sensitivity, threshold stability, and range gating resolution are contained with minimum compromise.

While the invention has been described in its preferred embodiments, it is to be understood that the words which have been used are words of description rather than of limitation and that changes within the purview of the appended claims may be made without departure from the true scope and spirit of the invention in its broader aspects.

We claim:
1. Base band signal selector means comprising:
   wide band transmission line receiver means for propagating base band pulse signals in the TEM transmission line mode substantially without distortion thereof,
   tunnel diode means having first and second terminal means coupled across said wide band transmission line means and responsive to said propagating base band pulse signals by a substantial change of conductivity state,
   pulse shaping circuit means coupled to aid first terminal means,
   integrator means responsive to said pulse shaping circuit means,
   constant current circuit means responsive to said integrator means for charging capacitor means,
   discharge circuit means responsive to said pulse shaping means for discharging said capacitor means, and
   circuit means for coupling said capacitor means to said first terminal for supplying a saw tooth wave form thereto.
2. Apparatus as described in claim 1 further including:
   differentiator means coupled to said capacitor means for generating a unipolar pulse train in response thereto, and
   transmitter means responsive to said differentiator means for radiating base band signals toward a reflecting object.
3. Apparatus as described in claim 2 further including coupling means for coupling pulses substantially synchronous with said radiated base band signals to said second terminal means from said transmitter means for sensitivity time control purposes.
4. Apparatus as described in claim 3 wherein said pulse shaping circuit means includes flip-flop circuit means.
5. Apparatus as described in claim 4 wherein said discharge circuit means includes transistor switch means responsive to said flip-flop circuit means for discharging said capacitor means.
6. Apparatus as described in claim 5 wherein said circuit means for coupling said capacitor means to said first terminal for supplying a saw tooth wave form thereto comprises emitter follower means.
7. Apparatus as described in claim 6 further including:
   gated detector means responsive to said flip-flop means for supplying a time extended pulse to utilization means, and
   range gate generator means responsive to said coupling means for coupling pulses substantially synchronous with said radiated base band signals for gating said gated detector means.
8. Apparatus as described in claim 7 wherein said utilization means comprises:
   actuator means, and
   means actuatable by said actuator means.
9. Apparatus as described in claim 8 wherein said range gate generator means comprises:
   pulse stretcher means responsive to said coupling means,
   variable delay means responsive to said pulse stretcher means, and
   gate generator means responsive to said variable delay means,
   said gated detector means being responsive to said gate generator means and to said flip-flop circuit means.

* * * * *